US006975380B2

(12) United States Patent
Eguchi et al.

(10) Patent No.: US 6,975,380 B2
(45) Date of Patent: Dec. 13, 2005

(54) METHOD OF MANUFACTURING A LIQUID CRYSTAL DISPLAY DEVICE

(75) Inventors: Shingo Eguchi, Tochigi (JP); Tetsuji Ishitani, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 91 days.

(21) Appl. No.: 10/614,224

(22) Filed: Jul. 8, 2003

(65) Prior Publication Data

US 2004/0008316 A1 Jan. 15, 2004

(30) Foreign Application Priority Data

Jul. 9, 2002 (JP) ............................. 2002-200318

(51) Int. Cl.[7] ............................................ G02F 1/1341

(52) U.S. Cl. ....................................... 349/189; 349/154

(58) Field of Search ................................ 349/153, 154, 349/187, 189

(56) References Cited

U.S. PATENT DOCUMENTS 5,893,625 A * 4/1999 Tamatani et al. ........... 349/189
6,239,855 B1 * 5/2001 Nakahara et al. ........... 349/153
2002/0024621 A1 * 2/2002 Hirakata et al. .............. 349/34

FOREIGN PATENT DOCUMENTS

JP 09-197416 7/1997
JP 11-237635 8/1999

* cited by examiner

*Primary Examiner*—Tarifur R. Chowdhury
*Assistant Examiner*—Richard H Kim
(74) *Attorney, Agent, or Firm*—Eric J. Robinson; Robinson Intellectual Property Law Office, P.C.

(57) ABSTRACT

A smectic liquid crystal, typically, ferroelectric liquid crystal is uniformly orientated as follows: a space is provided as a dummy region in an area outside a panel region where a liquid crystal inlet is placed; two substrates are overlapped and cut into panels of a desired size, leaving the panel region and the dummy region whereas the rest is cut off; a liquid crystal is injected with the dummy region left in the liquid crystal inlet portion; and, immediately after the liquid crystal is injected, the dummy region is cut off to carry out mono-stabilization treatment.

15 Claims, 8 Drawing Sheets

301 TWO SUBSTRATES ARE BONDED TO EACH OTHER

FIRST SEVERANCE

FIG. 2C PANEL 412

METHOD OF MANUFACTURING A LIQUID CRYSTAL DISPLAY DEVICE

BACKGROUND OF THE INVENTION

1. Field of the Invention

The present invention relates to a semiconductor device having a circuit that is composed of a thin film transistor (hereinafter referred to as TFT) and a method of manufacturing the semiconductor device. An example of the semiconductor device is electronic device having as one of its parts an electro-optical device, typically, liquid crystal display panel. Specifically, the present invention relates to a liquid crystal display device that uses a ferroelectric liquid crystal.

In this specification, the term semiconductor device refers to devices that utilize semiconductor characteristics to function, and electro-optical devices, semiconductor circuits, and electronic device are all regarded as semiconductor devices.

2. Description of the Related Art

In conventional liquid crystal panels, a liquid crystal is sandwiched between two substrates which are arranged in parallel to each other. The surfaces of the two substrates that are in contact with the liquid crystal often receive some alignment treatment in order to orientate liquid crystal molecules in a certain direction.

Examples of known alignment treatment include rubbing in which a thin film called an alignment layer is formed on a substrate in advance and then rubbed in one direction with cloth, and optical alignment in which an alignment layer is irradiated with polarized ultraviolet light to make the alignment layer anisotropic.

Among numerous liquid crystal materials, there are enumerated as thermotropic liquid crystal materials nematic liquid crystals whose molecules are generally aligned in one direction by alignment treatment; smectic liquid crystals whose molecule groups face the same direction and are stacked to form layers: and cholesteric liquid crystals which have a twist (helical) structure in addition to the same characteristic of nematic liquid crystals.

For smectic liquid crystals, which are represented by antiferroelectric liquid crystals and ferroelectric liquid crystals, it is difficult to achieve uniform alignment solely by the above alignment treatments.

Given below are reasons why achieving uniform alignment by conventional alignment treatment is difficult in ferroelectric liquid crystals.

FIGS. 7A and 7B show a ferroelectric liquid crystal interposed between a pair of substrates which have received conventional alignment treatment. A liquid crystal alignment direction 101 immediately after the liquid crystal is injected generally matches a direction 102 intended by the alignment treatment. At a closer look, however, the liquid crystal alignment direction 101 consists of two different alignment directions, 101A and 101B, which crisscross the substrate plane. This is because on one hand ferroelectric liquid crystal molecules naturally align in a direction close to the direction 102 intended by the alignment treatment but on the other hand the ferroelectric liquid crystal has two spontaneous polarization directions 103: a first substrate side direction 103A and a second substrate side direction 103B, to create different alignment states. When the mixed alignment states are observed under a polarizing microscope, a mosaic-like alignment pattern called a domain 104 and a zigzag dividing line are found. Therefore, high quality display cannot be obtained.

The presence of the domain 104 and the dividing line is recognized by a viewer as light leakage and an uneven image, namely, defective liquid crystal alignment, and greatly affects the quality of a displayed image. To give the liquid crystal display device a decent display quality, at least the domain 104 has to be removed by integrating the two alignment directions of the liquid crystal molecules into one.

There are several methods to achieve this. In one of those methods, the first step is to heat a pair of substrates that sandwich a ferroelectric liquid crystal uniformly throughout the substrate plane for phase transition of the liquid crystal. As a result, the liquid crystal is changed into the isotropic phase (I phase) or the chiral nematic phase (N* phase). Thereafter, the temperature is gradually lowered while applying direct current electric field to the pair of substrates in the direction of perpendicular to the substrates. When the temperature is dropped past the phase transition point, the ferroelectric liquid crystal returns from the isotropic phase (I phase) or the chiral nematic phase (N* phase) to its initial phase such as the chiral smectic C phase (SmC* phase). If electric field is applied to the liquid crystal at this point, because of the nature of the ferroelectric liquid crystal that directs its spontaneous polarization in one direction in accordance with the direction of the electric field, one of two different alignment directions becomes stable and resultantly, the alignment directions of the liquid crystal molecules are integrated into one. The electric field is turned zero after the phase transition into the chiral smectic C phase (SmC* phase) is induced by temperature drop and completed. This liquid crystal alignment method is called monostabilization.

Theoretically, a ferroelectric liquid crystal should be orientated uniformly by the above monostabilization method. In practice, however, defects accompanied with monostabilization treatment are often found that some regions deviate from the intended alignment. In some cases, defects accompanied with monostabilization treatment is caused due to influence of other components of the panel, for example, seal and a spacer. In other cases, defects accompanied with monostabilization treatment is caused by treatment conditions set inappropriately in injecting the liquid crystal and in monostabilizing the liquid crystal.

As shown in FIG. 8, defects 201 accompanied with monostabilization treatment is found particularly frequently in an area 202 near the inlet of the panel. The area 202 near the inlet serves as paths 203 through which every liquid crystal molecule enters the panel upon injection of the liquid crystal. Commonly, the inlet is made as narrow as possible for the sake of panel reliability and resultantly, injected liquid crystal molecules concentrate in the area 202 near the inlet. The amount of liquid crystal that passed the area 202 near the inlet is by far large compared with the rest of the panel.

The injected liquid crystal causes friction against the alignment layer along the liquid crystal molecule paths 203. If the frictional force is large, the effect that presents is similar to rubbing and could change the alignment of the liquid crystal rubbing against the alignment layer. The liquid crystal alignment direction set by the frictional force that is generated along the liquid crystal molecule paths 203 does not always match an alignment treatment direction 204 intended by a panel designer. When the two does not match, the panel locally suffers the defects 201 accompanied with monostabilization treatment.

Defective monostabilization could be avoided by optimizing liquid crystal injection conditions, alignment treatment conditions, and monostabilization conditions. In practice, however, optimizing these conditions is laborious and it seems that the merest margin is allowed for each condition. The inventors of the present invention have conducted experiments but have not been successful in finding out parameters which truly save a liquid crystal panel from the defects accompanied with monostabilization treatment.

Another method that may counter defects accompanied with monostabilization treatment is to prevent it from taking place in a display area by adjusting the position of a liquid crystal inlet of a liquid crystal panel such that the liquid crystal inlet is as far away from the display area as possible. However, putting a distance between the liquid crystal inlet and the display area creates an idle space within the panel. In addition, this method is not helpful in panel size reduction, which is a common way to lower the manufacture cost of the liquid crystal panel and the cost of panel's peripheral devices.

SUMMARY OF THE INVENTION

The present invention has been made in view of the above, and an object of the present invention is therefore to provide a method of manufacturing a liquid crystal display device which is capable of orientating a ferroelectric liquid crystal in a certain direction without causing defects accompanied with monostabilization treatment.

In order to attain the above object, a space is provided as a dummy region in an area outside a panel region where a liquid crystal inlet is placed. When seal is patterned, the inlet is extended long into the dummy region straight from the panel side. Then two substrates are overlapped and cut into panels of a desired size. In cutting out the panels, the panel region and the dummy region are left while the rest is cut off. The panel region and the dummy region at this stage remain as a single body, and the liquid crystal inlet of the panel is long temporarily. Then a liquid crystal is injected with the dummy region left in the liquid crystal inlet portion. Immediately, after the liquid crystal is injected, the dummy region is cut off and monostabilization treatment follows.

Above described Procedure may make a ferroelectric liquid crystal orient in a certain direction without causing defects accompanied with monostabilization treatment.

The present invention is characterized in that a liquid crystal inlet and a liquid crystal sealing port do not coincide with each other and that the liquid crystal inlet is severed after a liquid crystal is injected. In this specification, the term liquid crystal inlet refers to a portion which an injected liquid crystal first comes into contact with, whereas the term liquid crystal sealing port refers to a portion where the liquid crystal is ultimately sealed with an adhesive.

A structure of the present invention disclosed in this specification is a method of manufacturing a liquid crystal display device with a smectic liquid crystal interposed between a pair of substrates, wherein comprising:

forming a seal pattern on one of substrates, a seal pattern having a liquid crystal inlet that is extended from a liquid crystal sealing port;

bonding a pair of substrates to each other;

severing a substrates to obtain a pair of substrates in which the liquid crystal sealing port and the liquid crystal inlet are connected to each other;

injecting a smectic liquid crystal between the pair of substrates through the liquid crystal inlet; and separating the liquid crystal inlet and the liquid crystal sealing port from each other after the liquid crystal is injected.

Further, bonding may be performed after severing the substrates. Another structure of the present invention is a method of manufacturing a liquid crystal display device with a smectic liquid crystal interposed between a pair of substrates, wherein comprising:

forming a seal pattern on one of substrates, a seal pattern having a liquid crystal inlet that is extended from a liquid crystal sealing port;

severing the other substrate to obtain a pair of substrates in which the liquid crystal sealing port and the liquid crystal inlet are connected to each other;

injecting the smectic liquid crystal between the pair of substrates through the liquid crystal inlet; and separating the liquid crystal inlet and the liquid crystal sealing port from each other after the liquid crystal is injected.

Each of the above-mentioned structure is characterized in that the severance treatment includes scribing to cut off.

Further, each of the above-mentioned structure is characterized in that the smectic liquid crystal is a ferroelectric liquid crystal.

BRIEF DESCRIPTION OF THE DRAWINGS

In the accompanying drawings:

FIGS. 2A to 2C are diagrams showing an example of substrates used in manufacture of a ferroelectric liquid crystal panel and how the substrates are overlapped;

DETAILED DESCRIPTION OF THE PREFERRED EMBODIMENTS

Figures 1A, 1B, 1C, 1D, 1E:
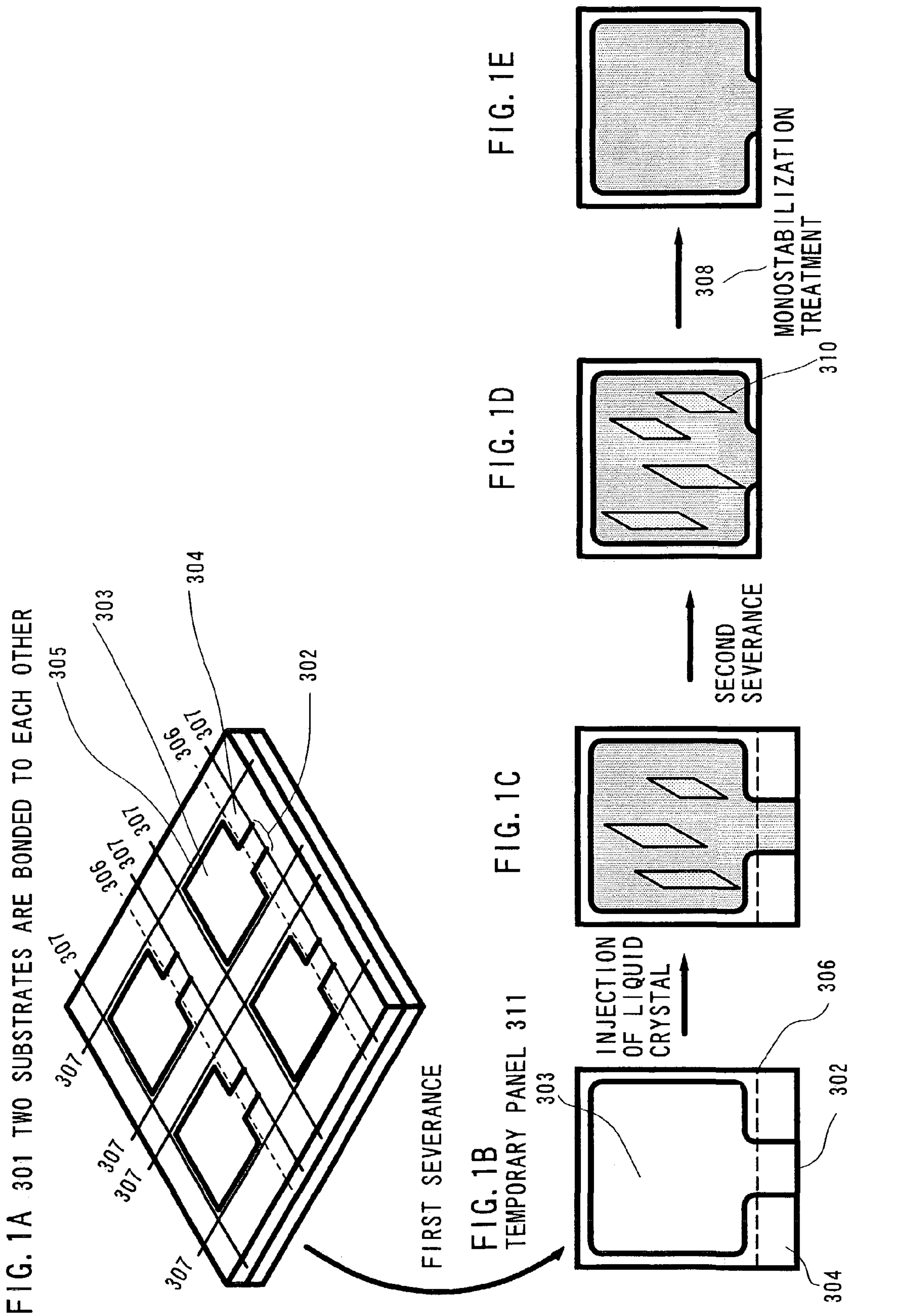
FIGS. 1A to 1E are process flow diagrams showing a part of the procedure from cutting of temporary panels out of overlapped substrates to a liquid crystal process.

An embodiment mode of the present invention is described below.

A description will be given on a manufacture process of the present invention with reference to FIGS. 1A to 1E.

First, a space is provided as a dummy region 304 in an area outside a panel region 303 where a liquid crystal inlet 302 is placed. When seal 305 is patterned, the seal pattern is placed on the perimeter of the panel region 303. An opening of the seal pattern is directed toward the dummy region away from the panel region to form the liquid crystal inlet 302. The seal pattern is formed in one place of a substrate or more than one seal patterns are formed in several places of the substrate.

Next, two substrates are bonded to each other. (FIG. 1A)

The substrate pair is cut into panels of a desired size each having one seal pattern that has the liquid crystal inlet 302. As shown in FIG. 1B, the panels are cut out by severing at cut-off points 307 while leaving a cut-off point 306 between the panel region 303 and the dummy region 304. At this stage, the panel region 303 and the dummy region 304 remain as a single body to constitute one panel which has long liquid crystal inlet 302 for the time being.

Then a ferroelectric liquid crystal which is one of smectic liquid crystals is injected through the opening of the seal pattern, namely, the liquid crystal inlet 302. (FIG. 1C) Note that defects accompanied with monostabilization treatment take place near the dummy region 304 if monostabilization treatment follows immediately after the injection of the liquid crystal.

Immediately after the liquid crystal is injected, the dummy region 304 is cut off (FIG. 1D). The portion that is cut off is a region between the panel area and the opening of the seal pattern. Now the panel is ready to receive monostabilization treatment 308. (FIG. 1E) When cutting the dummy region 304 off, liquid crystal alignment defect 310 may be caused by the stress of panel severance on the liquid crystal. The alignment defect can be remedied by a subsequent monostabilization treatment 308.

The present invention structured as above will be described in more detail through the following embodiments.

Embodiments

Embodiment 1

This embodiment gives a description of the structure of a passive matrix ferroelectric liquid crystal panel and a process of manufacturing the same. Although a passive matrix panel is given here as an example, there is no particular limitation and the present invention is also applicable to an active matrix panel. The liquid crystal material used is one whose phase sequence is: isotropic phase (I phase)→chiral nematic phase (N* phase)→chiral smectic phase (SmC* phase)→crystal phase.

Figure 2A:
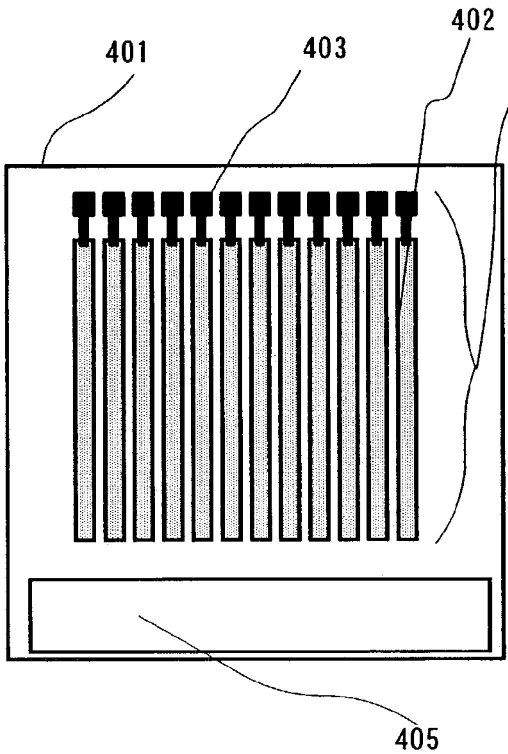
Figure 2B:
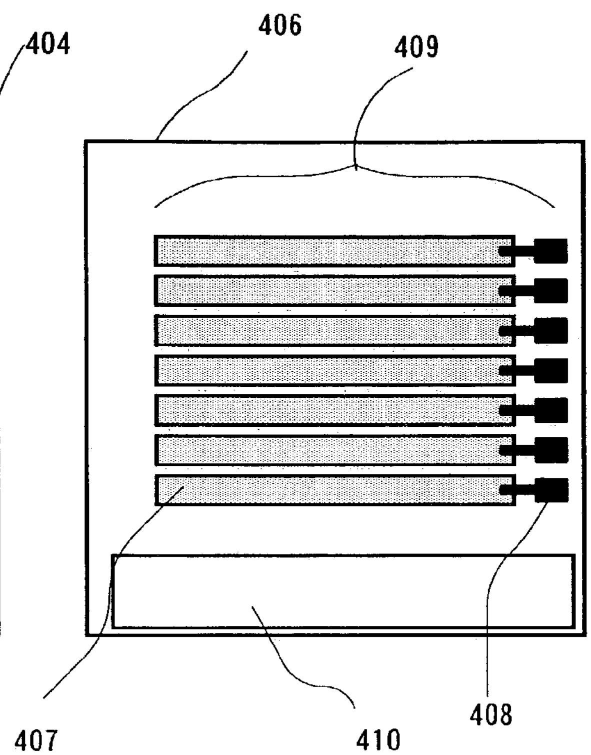
Figure 2B:
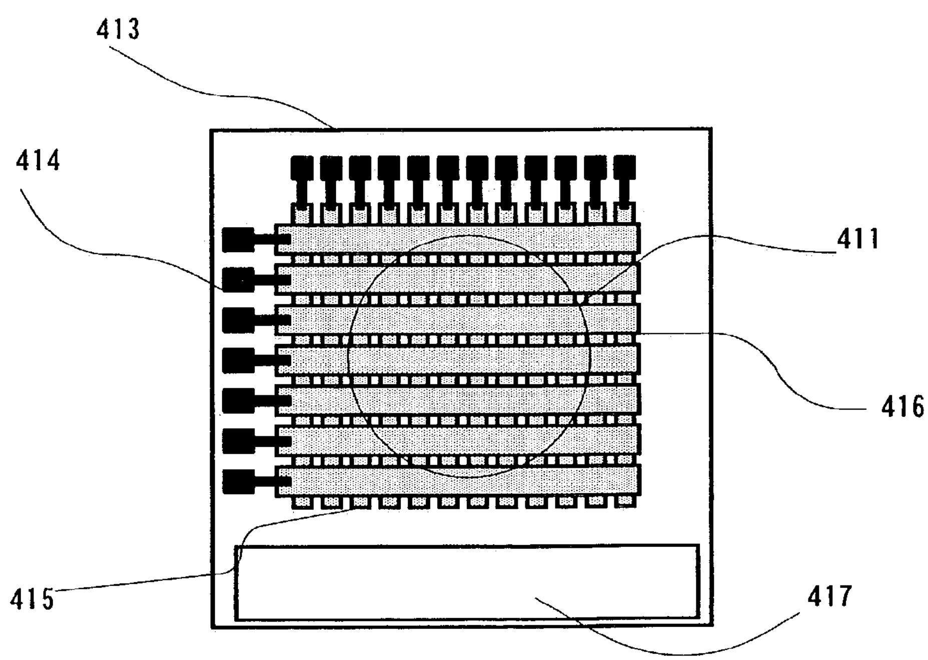

FIGS. 2A and 2B show an example of substrates used in manufacture of a passive matrix panel. A conductive transparent film of ITO (indium tin oxide) is placed on a first glass substrate 401 forming a stripe pattern. The stripe pattern is arranged with 402 and an aluminum wire of a group of leading out wirings 403 is provided for each stripe of the stripe pattern 402. The group of wirings 403 is electrically connected to one end of the stripe pattern 402, and extends therefrom in the direction of opposite to the ITO stripe pattern 402. The group of wirings 403 and the ITO stripe pattern 402 are connected on one-on-one basis and only one wire out of the group of wirings 403 is electrically connected to one stripe.

One stripe of the ITO stripe pattern 402 and one wire of the group of wirings 403 that is electrically connected to the stripe constitute one address line 404. One address line 404 is electrically independent of another address line 404. When the panel is assembled, the ITO stripe pattern 402 is inside the panel and serves as pixel electrodes. On the other hand, the group of wirings 403 extends from the inside of the panel to the outside and serves as leading out wirings for connection to external input terminals.

A second glass substrate 406 is similar to the first substrate 401, and has a combination of an ITO stripe pattern 407 and a group of wirings 408 which constitute address lines 409. However, the stripes in the second substrate 406 are different from those of the first substrate 401 as follows. When the first substrate 401 and the second substrate 406 are overlapped in a later step, the stripe patterns 402 and 407 of the substrates cross each other and their intersection portions serve as pixels 411 which are arranged into a matrix.

According to the above wire arrangement, the group of wirings 403 of the first substrate 401 concentrate on one side 413 out of four sides of the pixel area that the ITO stripe pattern 402 forms and the same applies to the second substrate 406 where the group of wirings 408 concentrates on one side 414 out of four sides of the ITO stripe pattern 407. As shown in FIG. 2C, when the substrates 401 and 406 are later overlapped to form one panel 412, the group of wirings 403 of the first substrate and the group of wirings 408 of the second substrate occupy adjacent two sides 413 and 414 out of the four sides of the panel. To rephrase, two sides out of the four sides of the panel, namely 415 and 416, have no group of wirings of the substrates. A liquid crystal inlet is placed on one of these two sides 415 and 416. In corresponding areas 405 and 410 of the substrates 401 and 406 where the liquid crystal inlet is to be placed, a space is kept as a dummy region 417 in advance.

Figure 3A:
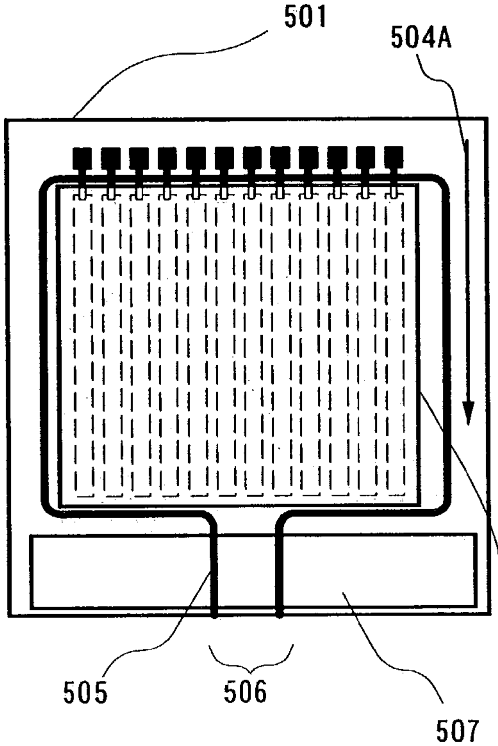
FIGS. 3A to 3C are diagram showing a process of manufacturing a panel from two substrates.
Figure 3B:
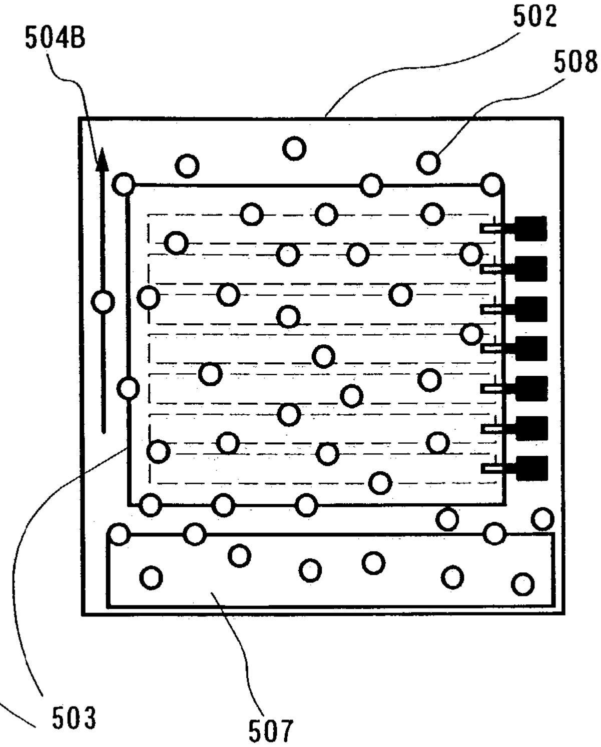
Figure 3C:
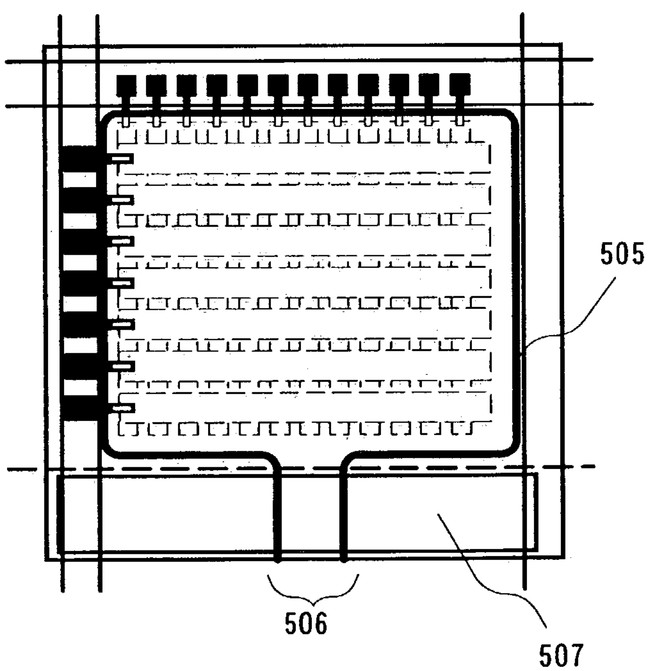

FIGS. 3A to 3C show first and second substrates 501 and 502 on which polyimide-based alignment layers 503 are formed by printing. The thickness of the layers 503 is 30 to 100 nm each. The alignment layer material that seems desirable from the viewpoint of liquid crystal alignment characteristic is, in the case of a ferroelectric liquid crystal, one having such horizontal alignment that gives the liquid crystal a pre-tilt angle of 0 to 1 degree with respect to the alignment layers 503. Formation of the alignment layers 503 by printing is followed by pre-baking on a hot plate at 80° C. for 2 minutes. The subsequent step is main baking in a clean oven at 180° C. for 60 minutes.

Thereafter, rayon or similar fabric is used in rubbing treatment to rub the alignment layers 503 formed on the first and second substrates in one direction: a direction 504A for the first substrate and a direction 504B for the second substrate. The rubbing treatment gives the alignment layers 503 a function of aligning the liquid crystal. The rubbing directions 504A and 504B are parallel to each other in opposite directions when the substrates are overlapped. After the rubbing treatment, particles generated in this step are removed by rinsing with water.

A UV-curable seal material 505 is applied to form a pattern by dispensing on one of the first and second substrates. The seal material 505 forms side walls of the panel to seal the liquid crystal within the panel and, at the same time, bonds the first and second substrates 501 and 502 to each other as an adhesive, while keeping a certain gap between the substrates. A liquid crystal inlet 506 which is necessary to introduce the liquid crystal into the panel is also formed in this step by forming the seal pattern. The liquid crystal panel of this embodiment has a 2 $\mu$m gap between the substrates. Because of this short cell gap, this embodiment does not need to add a gap keeping substance to the seal material 505, which is a common procedure in TN panels and the like.

At this point, the opening of the seal pattern to serve as the liquid crystal inlet is directed toward a dummy region 507 away from the end of the panel region.

On the other hand, a spacer 508 is sprayed onto the substrate where the seal pattern is not formed. The spacer 508 is a spherical substance (the spheres have size distribution of the diameter centered at 2 $\mu$m) of silicon oxide. The spacer 508 (2 mg) is mixed in isopropyl alcohol (50 ml) and then dispersed by ultrasonic for 15 minutes. The solution (2 ml) is immediately dropped onto the substrate, which is rotated at 1500 rpm so that the spacer 508 is scattered all over the substrate surface. This operation is repeated once more to ultimately obtain a dispersion density of 50 to 100 spheres/mm$^2$, which is counted by microscope observation.

After receiving respective treatments described above, the substrates are laid on top of each other. When overlapping the substrates, uniform pressure is applied in a direction parallel to the normal line direction of the substrates in order to control the gap between the pair of substrates (cell gap). A jig for overlapping the substrates has a platen that holds the substrates, and the platen is partially transmissive of ultraviolet rays so that the seal material is irradiated with ultraviolet rays while the substrates are pressurized. With the pair of substrates kept fully pressurized, the overlapped substrates are irradiated with ultraviolet rays to cure the seal material 505.

Next, as shown in FIG. 1A, the first severance is performed on the overlapped substrates. Portions to be severed are marked by scribe lines 306 and 307 using a glass cutter, and the marked portions are selectively pressurized from the rear side. The local pressurizing from the rear side stresses the scribe lines 307 until the substrates are severed along the scribe lines 307.

Through the first severance, panels are cut out of the overlapped substrates as shown in FIG. 1B. In the region of one panel that corresponds to the pixel area, two substrates overlap each other. Though not shown in the drawing, group of wirings extending from the pixel area are connected as external input terminals to external circuits and therefore are partially exposed on the surface level. At this point, the scribe line 306 between the panel region 303 and the liquid crystal inlet 302 which is the opening is marked but not severed yet. Accordingly, a panel cut out at this stage is a temporary panel 311 in which the dummy region 304 remains attached to the panel region 303 for the time being.

Thereafter, a ferroelectric liquid crystal which is one of smectic liquid crystals is injected into the panel by dipping (FIG. 1C). First, a system that includes the temporary panel 311 and the liquid crystal is set to vacuum. The system is then heated to 100° C. to change the phase of the liquid crystal to the isotropic phase. The liquid crystal in this state is low in viscosity and thus allows the use of the usual technique for injecting a nematic liquid crystal. It is not until this state is reached that the liquid crystal is brought into contact with the liquid crystal inlet 302 of the temporary panel 311 and is injected. After the liquid crystal is let into the panel by capillary action to a certain degree, the vacuum level of the system is gradually lowered and the system is ultimately returned to normal pressure. This process utilizes the pressure difference between the interior of the temporary panel 311 and the system to inject the liquid crystal. After confirming that the interior of the temporary panel 311 is completely filled with the injected liquid crystal, the temperature of the system is gradually turned back to room temperature.

After the liquid crystal is injected, the second severance is carried out by holding the temporary panel in hands and breaking it into the panel region 303 and the dummy region 304 along the scribe line 306 which has been marked prior to the liquid injection between the panel region 303 and the opening serving as the liquid crystal inlet 302 (FIG. 1D). If the second severance is skipped to go directly to monostabilization, factors that cause defects accompanied with monostabilization treatment are generated in the dummy region 304. By cutting the dummy region off through the second severance, there are no factors in the panel region 303 that induce defects accompanied with monostabilization treatment.

After the dummy region 304 is cut off, UV-curable resin (not shown in the drawing) is applied to the liquid crystal inlet 302. The UV-curable resin is cured by ultraviolet irradiation to seal the liquid crystal inlet 302.

Figure 4:
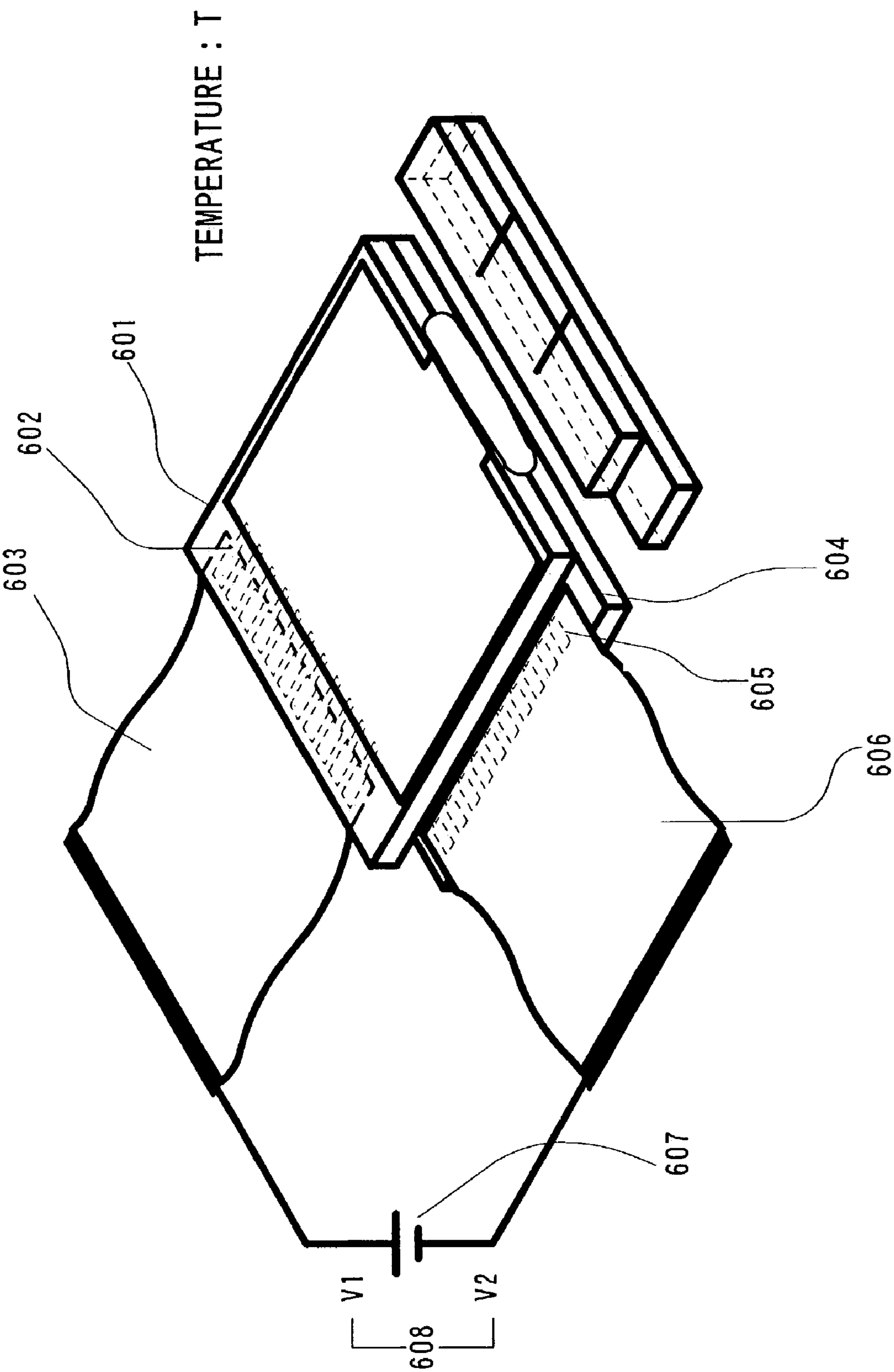
FIG. 4 is a diagram showing a process subsequent to attaching FPCs.

Then, as shown in FIG. 4, FPCs (flexible printed circuits) 603 and 606 are connected to external input terminals 602 and 605, which are groups of wirings formed on the first and second substrates (denoted by 601 and 604, respectively) of the panel. The external input terminals 602 and 605 are exposed on the surface when the substrates are cut into panels, so that external circuits can be connected thereto. The FPCs 603 and 606 have copper wires formed in polyimide or other organic resin films, and are connected to external input terminals through an anisotropic conductive adhesive. The anisotropic conductive adhesive is composed of an adhesive and particles mixed therein. The particles are tens to hundreds microns in diameter, are plated with gold or the like, and have a conductive surface. When the particles come into contact with the external input terminals and the copper wires, an electrical contact is formed between the terminals and the wirings. In order to enhance the strength of bonding between the FPCs and the substrates, the FPCs 603 and 606 are extended outward beyond the external input terminals 602 and 605 when the FPCs 603 and 606 are adhered. Resin layers (not shown in the drawing) are provided at the ends together with the anisotropic conductive adhesive and enhance the mechanical strength in this portion.

The first FPC 603 connected to the external input terminal 602 of the first substrate 601 and the second FPC 606 connected to the external input terminal 605 of the second substrate 604 are connected to a direct current power supply 607. Then, the panel is placed on a hot plate and heated at 100° C. uniformly throughout the panel plane. As the panel is sufficiently heated, the direct current power supply 607 is turned on to apply a direct current voltage 608 to the panel. In this step, a first voltage V1 is applied to every part of the first FPC 603 and a second voltage V2 is applied to every part of the second FPC 606. The electric potential difference between the first voltage V1 and the second voltage V2 is 5 V. Thereafter, while keep applying the voltage 608, the temperature of the hot plate is controlled to gradually lower the panel heating temperature. In this embodiment, the hot plate temperature is controlled such that the panel heating temperature drops at a rate of 2.0° C. per minute.

When the hot plate temperature is lowered to 25° C., the electric potential difference between the first voltage V1 and the second voltage V2 is turned to 0 V. Then, the FPCs 603 and 606 are disconnected from the direct current power supply 607 and the first FPC 603 and the second FPC 606 are to be short-circuited. When the panel is later installed in a display device, the short-circuit between the FPCs 603 and 606 is lifted and then the FPCs 603 and 606 are connected to driver circuits.

A passive matrix display device using a ferroelectric liquid crystal is thus completed.

Embodiment 2

Any electronic device with a liquid crystal module (a passive matrix liquid crystal module or an active matrix liquid crystal module) incorporated therein can be obtained by carrying out the present invention.

Examples of such electronic device include, video cameras, digital cameras, head mount displays (goggle type displays), car navigations, projectors, car stereos, personal computers, and portable information terminals (such as mobile computers, mobile telephones and electronic books). Some of them are shown in FIGS. 5A to 5F and 6A to 6C.

Figure 5A:
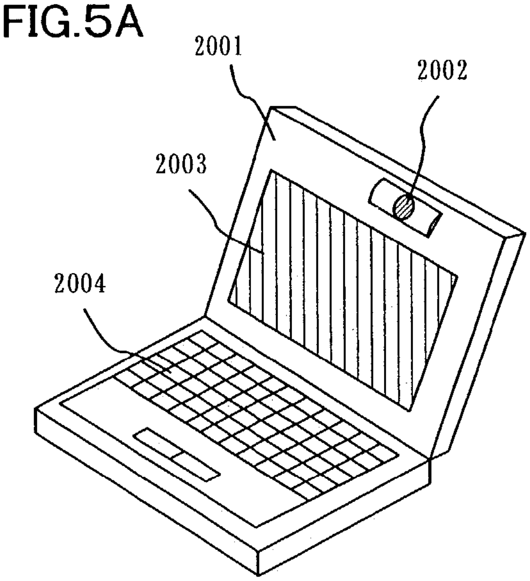
FIGS. 5A to 5F are diagrams showing examples of electronic equipment.

FIG. 5A shows a personal computer, which is composed of a main body 2001, an image input portion 2002, a display portion 2003, a keyboard 2004, and the like.

Figure 5B:
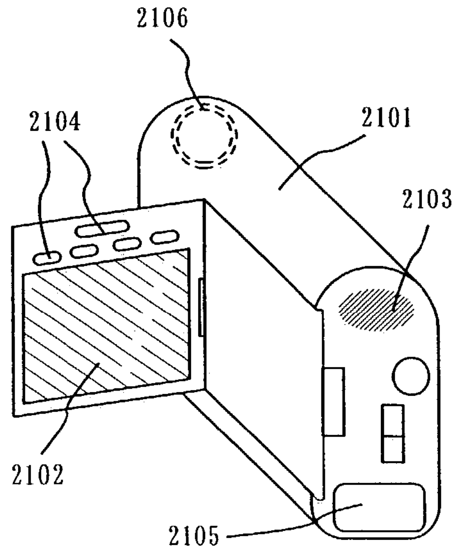

FIG. 5B shows a video camera, which is composed of a main body 2101, a display portion 2102, an audio input portion 2103, operational keys 2104, a battery 2105, an image receiving portion 2106, and the like.

Figure 5C:
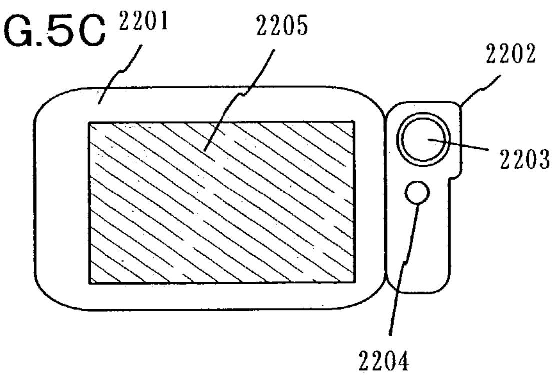

FIG. 5C shows a mobile computer, which is composed of a main body 2201, a camera portion 2202, an image receiving portion 2203, operational keys 2204, a display portion 2205, and the like.

Figure 5D:
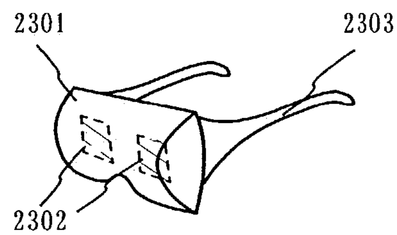

FIG. 5D shows a goggle type display, which is composed of a main body 2301, display portions 2302, arm portions 2303, and the like.

Figure 5E:
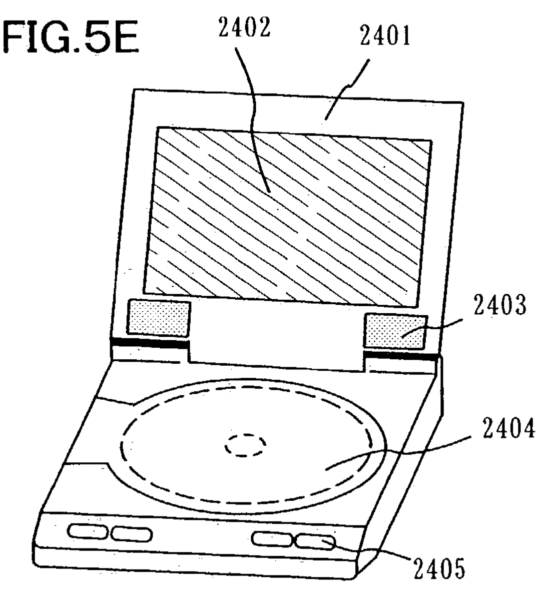

FIG. 5E shows a player using a recording medium having a program recorded therein (hereinafter referred to as a recording medium), which is composed of a main body 2401, a display portion 2402, a speaker portion 2403, a recording medium 2404, operational keys 2405, and the like. Note that a DVD (digital versatile disc) or a CD is applied as the recording medium for the player, and the player can be used for musical appreciation, film appreciation, games, and access to the Internet.

Figure 5F:
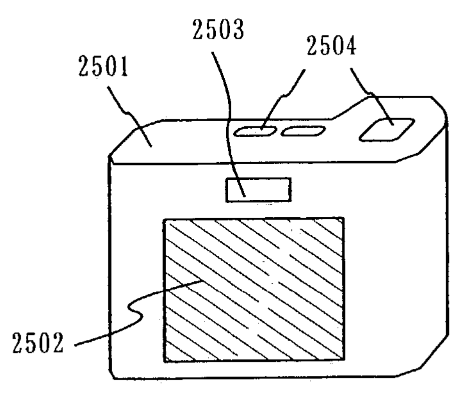

FIG. 5F shows a digital camera, which is composed of a main body 2501, a display portion 2502, an eyepiece portion 2503, operational keys 2504, an image receiving portion (not shown in the figure), and the like.

Figure 6A:
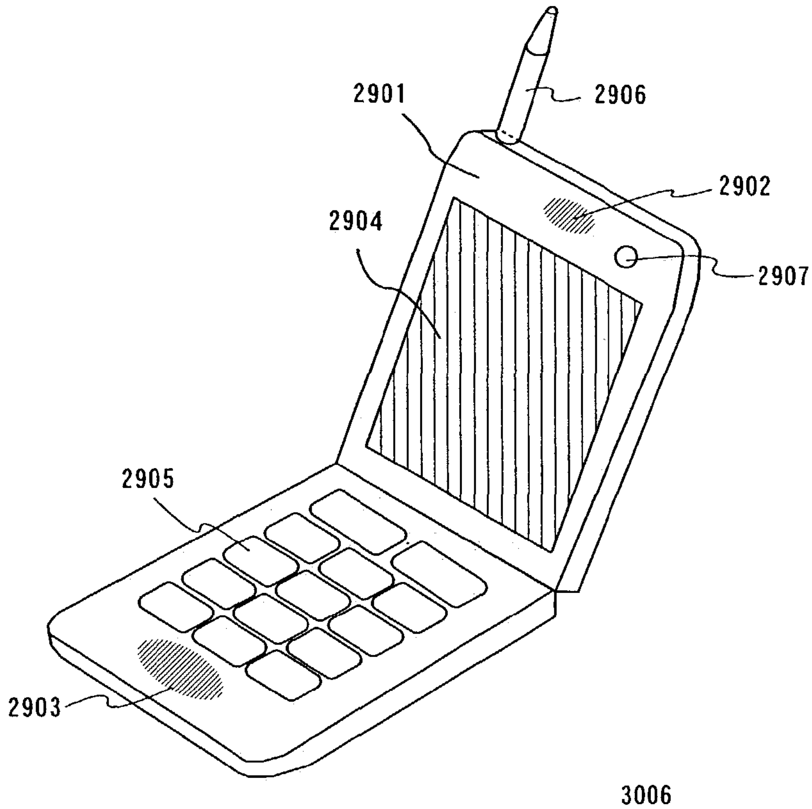
FIGS. 6A to 6C are diagrams showing examples of electronic equipment.

FIG. 6A shows a mobile telephone, which is composed of a main body 2901, an audio output portion 2902, an audio input portion 2903, a display portion 2904, operational keys 2905, an antenna 2906, an image input portion (CCD, image sensor, [etc.] and the like) 2907, and the like.

Figure 6B:
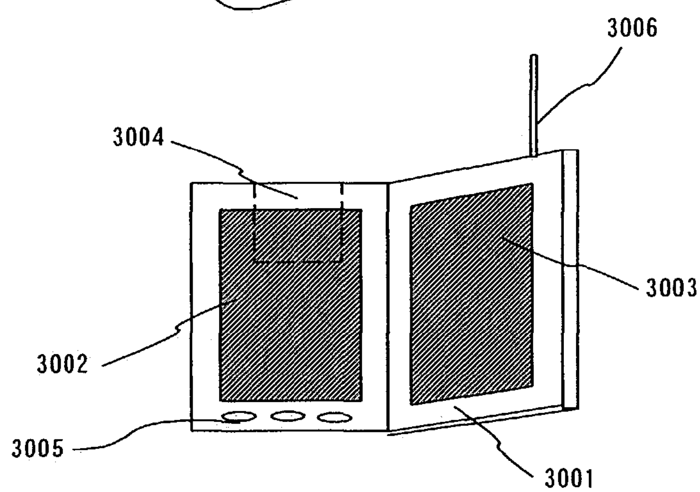

FIG. 6B shows a portable book (electronic book), which is composed of a main body 3001, display portions 3002 and 3003, a recording medium 3004, operational keys 3005, an antenna 3006, and the like.

Figure 6C:
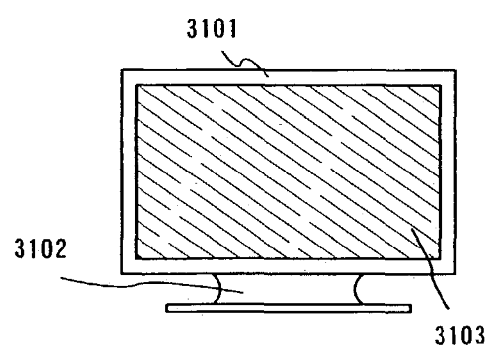
Figure 7A:
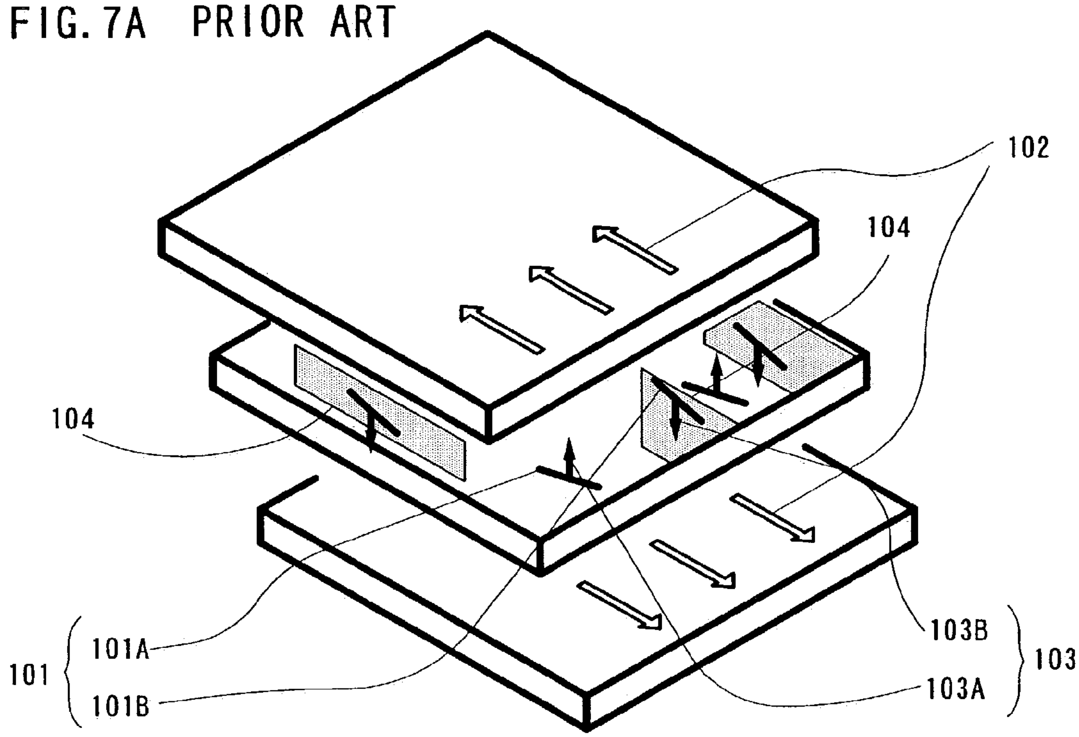
FIGS. 7A and 7B are diagrams showing a state of a panel when a ferroelectric liquid crystal is injected.
Figure 7B:
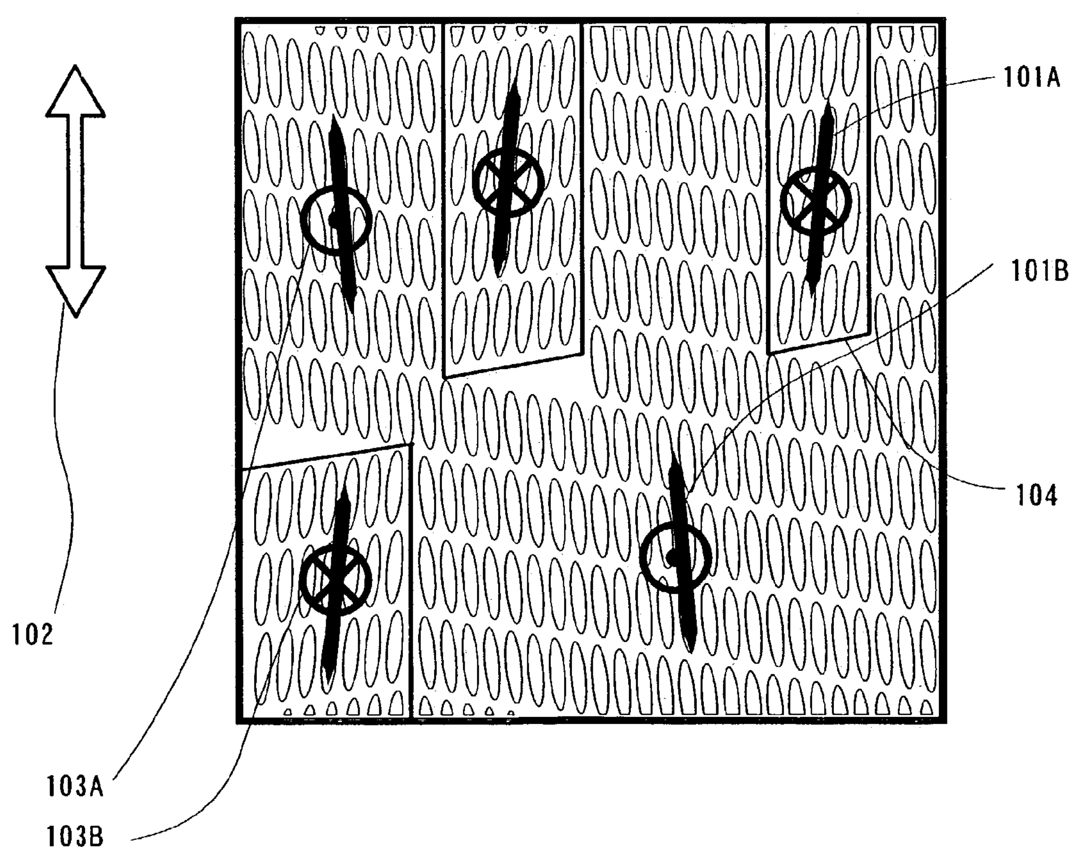
Figure 8:
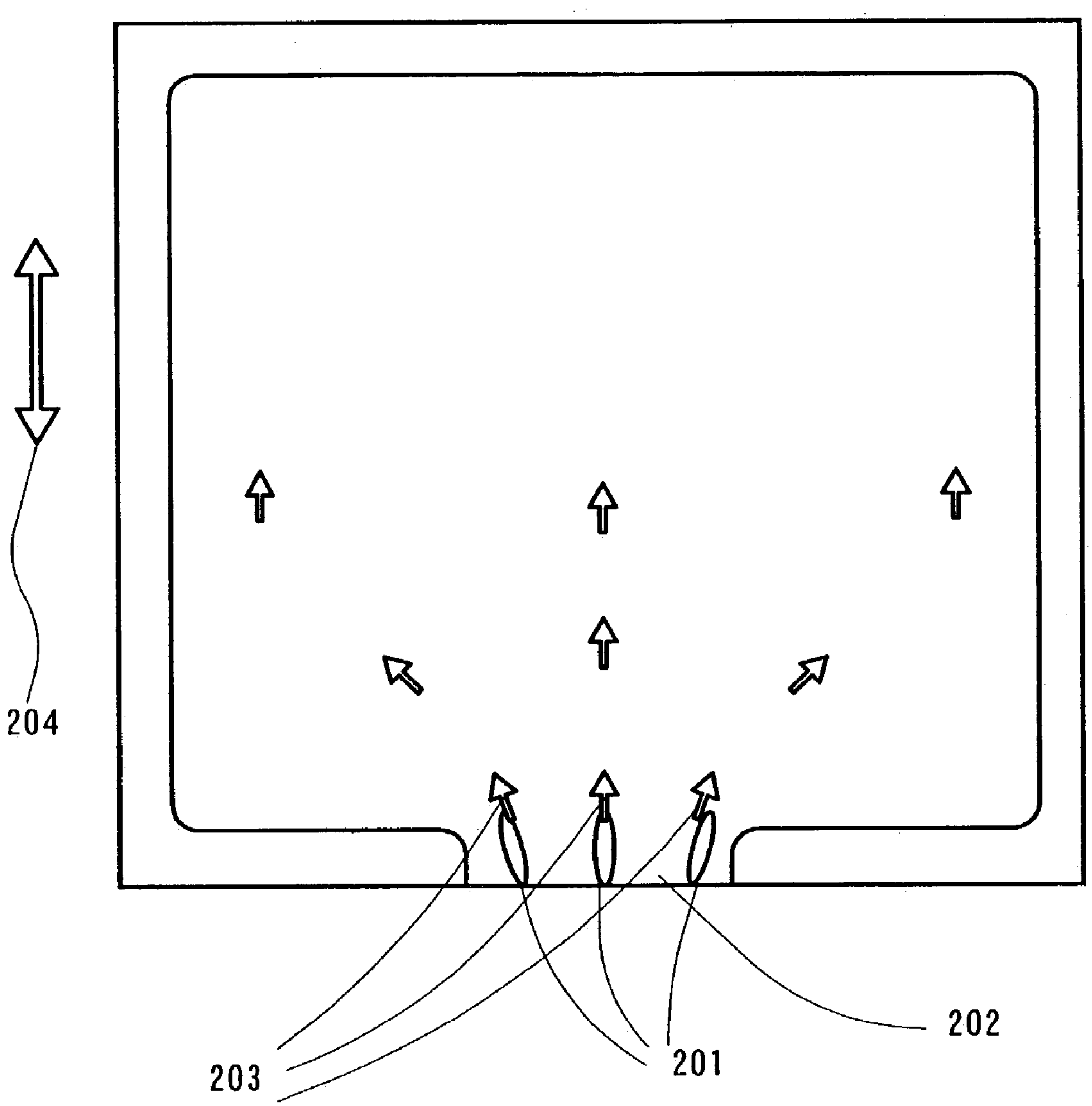
FIG. 8 is a diagram showing liquid crystal paths and how defects accompanied with monostabilization treatment takes place.

FIG. 6C shows a display, which is composed of a main body 3101, a support stand 3102, a display portion 3103, and the like.

As described above, the present invention has such a wide application range that it is applicable to a manufacture method for electronic devices of any field. Any electronic devices of this embodiment can be obtained whichever combination among Embodiment Mode, Embodiment 1, and Embodiment 2 is chosen for its structure.

According to the present invention, defects accompanied with monostabilization treatment in a ferroelectric liquid crystal panel is readily removed and the display quality of the liquid crystal display device is improved without increasing the panel size.

What is claimed is:

1. A method of manufacturing a liquid crystal display device, comprising:

injecting a liquid crystal between a pair of substrates through an opening of a seal pattern, the pair of substrates sandwiching the seal pattern, the opening being positioned apart from a panel region; and severing the pair of substrates along a line drawn between the opening and the panel region after injecting the liquid crystal.

2. A method of manufacturing a liquid crystal display device according to claim 1, wherein the severance treatment includes scribing to cut off.

3. A method of manufacturing a liquid crystal display device according to claim 1, wherein the liquid crystal is a smectic liquid crystal.

4. A method of manufacturing a liquid crystal display device according to claim 1, wherein the smectic liquid crystal is a ferroelectric liquid crystal.

5. A method of manufacturing a liquid crystal display device according to claim 1, wherein the second severance treatment is followed by monostabilization treatment.

6. A method of manufacturing a liquid crystal display device with a liquid crystal interposed between a pair of substrates, the method comprising:

forming, on one of the substrates, one or more seal patterns with an opening positioned apart from a panel region;

bonding the substrate to the other substrate;

performing first severance treatment on the bonded substrate to obtain a pair of substrates having one of the seal patterns;

injecting the liquid crystal between the pair of substrates through the opening of the seal pattern; and performing second severance treatment on the pair of substrates along a line drawn between the opening and the panel region after injecting the liquid crystal.

7. A method of manufacturing a liquid crystal display device according to claim 6, wherein the severance treatment includes scribing to cut off.

8. A method of manufacturing a liquid crystal display device according to claim 6, wherein the liquid crystal is a smectic liquid crystal.

9. A method of manufacturing a liquid crystal display device according to claim 6, wherein the smectic liquid crystal is a ferroelectric liquid crystal.

10. A method of manufacturing a liquid crystal display device according to claim 6, wherein the second severance treatment is followed by monostabilization treatment.

11. A method of manufacturing a liquid crystal display device with a liquid crystal interposed between a pair of substrates, the method comprising:

forming, on one of the substrates, one or more seal patterns with an opening positioned apart from a panel region;

performing first severance treatment on the substrate to obtain a substrate having one of the seal patterns;

bonding the substrate to the other substrate to form a pair of substrates;

injecting the liquid crystal between the pair of substrates through the opening of the seal pattern; and performing second severance treatment on the pair of substrates along a line drawn between the opening and the panel region after injecting the liquid crystal.

12. A method of manufacturing a liquid crystal display device according to claim 11, wherein the severance treatment includes scribing to cut off.

13. A method of manufacturing a liquid crystal display device according to claim 11, wherein the liquid crystal is a smectic liquid crystal.

14. A method of manufacturing a liquid crystal display device according to claim 11, wherein the smectic liquid crystal is a ferroelectric liquid crystal.

15. A method of manufacturing a liquid crystal display device according to claim 11, wherein the second severance treatment is followed by monostabilization treatment.

* * * * *